United States Patent

[11] 3,537,492

| [72] | Inventor | Karl J. Ritt |
| | | 1415 W. Belmont, Chicago, Illinois 60657 |
| [21] | Appl. No. | 660,311 |
| [22] | Filed | Aug. 14, 1967 |
| [45] | Patented | Nov. 3, 1970 |

[54] CUTTING TOOL ADAPTER
6 Claims, 6 Drawing Figs.

[52] U.S. Cl. .................................................... 144/136
[51] Int. Cl. ..................................................... B27g 13/14
[50] Field of Search .......................................... 143/43,
43-1, 43-1.5, 43-2, 43-30; 144/35-1, 136, 136.3, 2—4, 118

[56] References Cited
UNITED STATES PATENTS
1,702,059  2/1929  Schneider ........................ 144/2
1,793,053  2/1931  Cahill et al ....................... 144/35
2,548,411  4/1951  Vache ............................. 144/35X Primary Examiner—Andrew R. Juhasz
Assistant Examiner—Z. R. Bilinsky
Attorney—Dominik, Knechtel and Godula ABSTRACT: A cutting tool adapter for coupling to power sources such as a hand electric drill. The adapter has a bottom cutting head which is spring-mounted on a working shaft, and a gear train which connects the working shaft at right angles to a countershaft actuated by the power source. The adapter has a flat foot plate to guide the adapter and a rearward coupler dimensioned for secure mounting to the forward end of an electric drill. The bottom cutting head operates close to a support surface so that grooves may be cut at the bottoms of moldings or the like.

Patented Nov. 3, 1970

Inventor
Karl J. Ritt
By Edmund A. Godula
Attorney 3,537,492

CUTTING TOOL ADAPTER

SPECIFICATION

This invention concerns an adapter tool for many power sources, particularly for hand electric drills; and the invention further relates to an adapter having an improved coupler for mounting to the forward end of the electic drills, as well as such a coupler. The invention particularly relates to an adapter which has a lower cutting head that is rotated by a shaft whose longitudinal axis is disposed at substantially right angles to the longitudinal axis of a countershaft driven by a power source.

It is an advantage to provide the art with various types of tool adapters which may be operated by a driving shaft turned by a power source such as an electric motor. A commonplace power source is that provided in hand electric drills such as the conventional ¼inch and ⅜inch drills. Since such hand electric drills are widely distributed, it is desirable to provide an adapter tool for such drills which can perform working operations in a new and improved manner. It is particularly desirable to provide an adapter in which a cutting tool can perform its work closely to a support surface on which the tool is maneuvered or guided.

It is accordingly one primary object of this invention to provide an improved adapter tool in which a rotating cutting head operates in a plane close to the plane of a support surface on which the tool is guided. This object is further served by providing an improved coupler for mounting such an adapter, or other adapters, to an electric drill.

Yet another important object of the invention is a coupler for tool adapters, with horizontal countershafts, said coupler being mountable to electric drills or the like, and said coupler being accessible to tools for clamping the drill chuck to the horizontal shaft of an adapter tool.

A still further object of the invention is an adapter tool and coupler of the type described which may be evenly guided on a support surface, and in which a cutting head may operate close to said supporting surface.

Another important object of the invention is an adapter and coupler of the type described in which a vertical shaft is yieldable against biasing means so the tool is self-adjusting to heads of varying thickness which may be interchanged, and so that a cutting head may be properly positioned relative to the bottom of a guide plate on the adapter.

Objects such as the foregoing are attained, together with still other objects which will occur to practitioners from time to time, by the adapter tool described and shown in the following disclosure, including drawings wherein.

Use of the same numerals in the various views will indicate a reference to the same structures, elements and parts.

Figure 1:
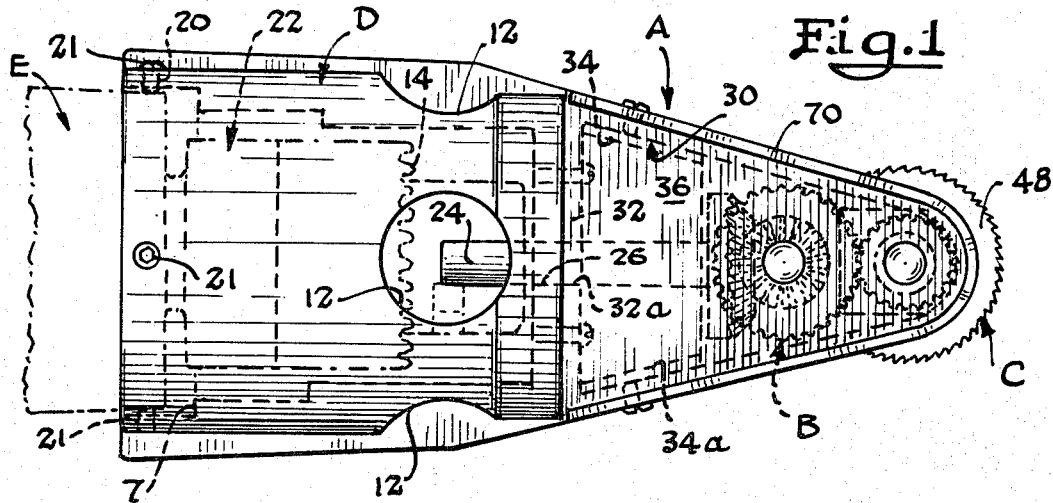
FIG. 1 is a top plan view of the adapter tool with a portion of the forward end of an electric drill indicated in phantom and somewhat diagrammatically.
Figure 2:
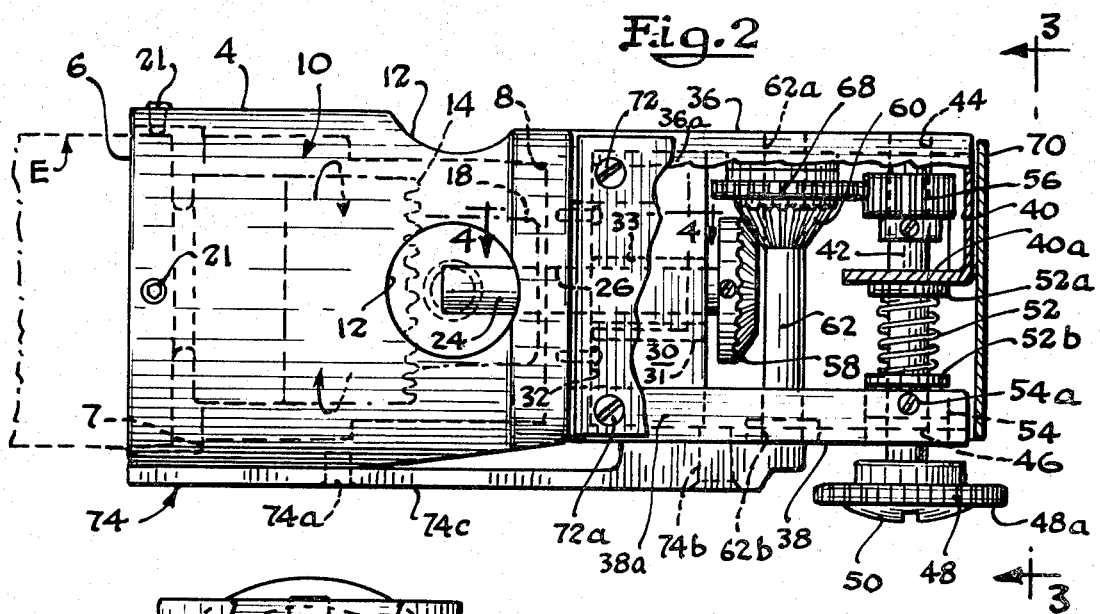
FIG. 2 is a side elevational view of the adapter tool and forward end of an electric drill shown in FIG. 1.
Figure 3:
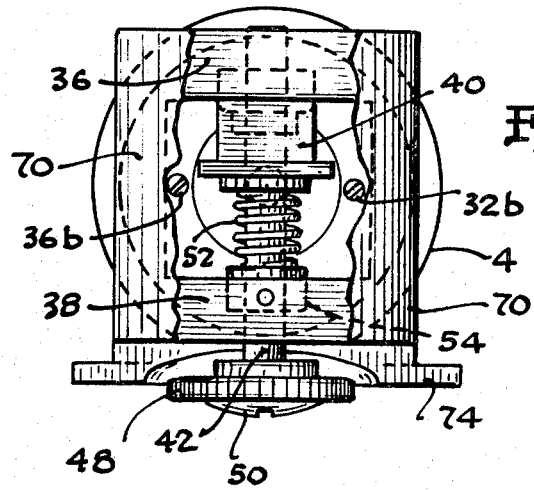
FIG. 3 is a front elevational view along line 3–3 of FIG. 2 with portions removed for purposes of clarity.
Figure 4:
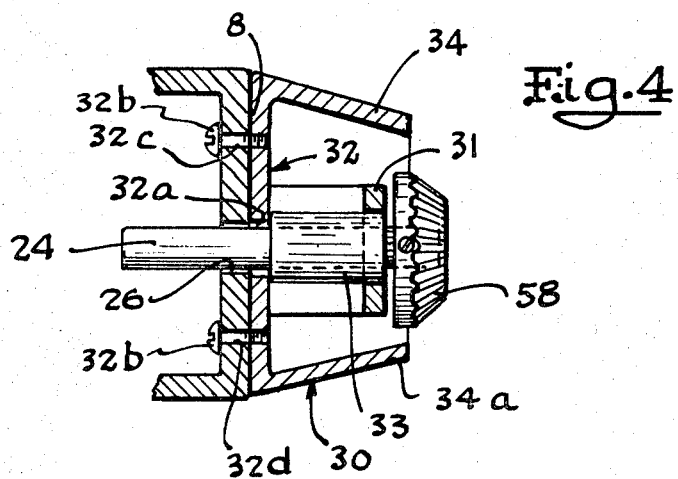
FIG. 4 is a section view along line 4–4 of FIG. 2 with parts removed.
Figure 6:
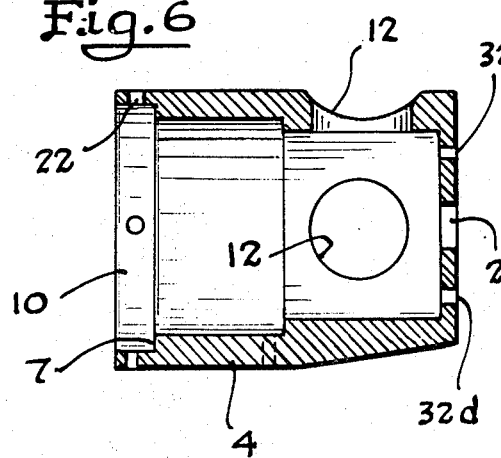
FIG. 6 is a section view along line 6–6 of FIG. 5.
Figure 5:
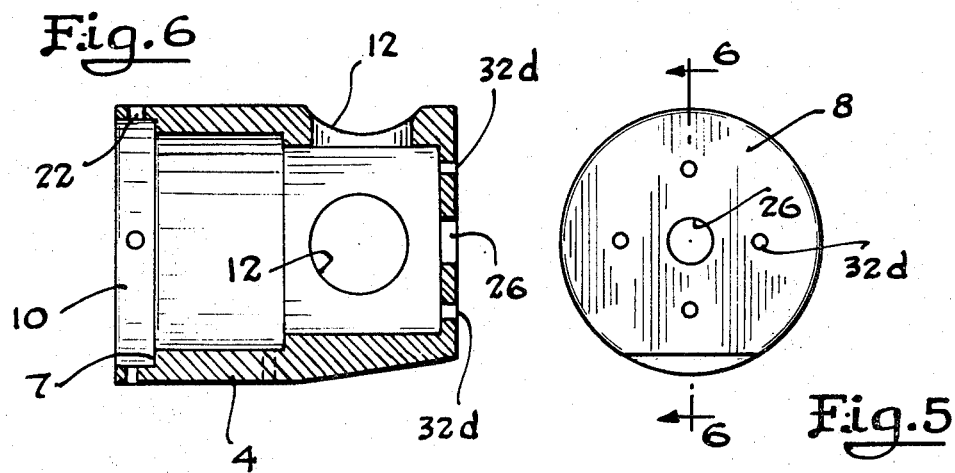
FIG. 5 is an elevational end view of the coupler member.

Looking at the drawings, the adapter has a forward housing part A which houses a gear train B. A rearward coupler part D is mounted to the forward end of an electric drill E indicated in phantom and somewhat diagrammatically.

The coupler has a substantially cylindrical configuration with continuous wall 4 having an open end 6, end wall 8, and a substantially circular socket 10. This coupler shows three circular openings which are spaced about 90° apart, and each of the openings is indicated by the numeral 12. These passageways serve as entry means for a tool (not shown) which may engage a circumferential gearing 14 of a rotating drill chuck or working head of an electric drill. Actuating the gear surface will lead to conventional operation of the clamping elements (not shown).

The continuous wall of the coupler has a plurality of fastening means shown here as bore 20 for Allen screws 21 which are adapted to form an interlock with the forward portions of an electric drill indicated in phantom at 22. The chuck head 18 of an electric drill may be mounted on the end of a horizontal driving or countershaft 24 which passes through aperture 26 in the end wall 8. The socket 10 has a reduced diameter area defined by continuous shoulder 7 to help secure the coupler to the body of the drill.

The illustrated forward housing includes a channel spacer 30 having a base 32 with a bore 32a, through which shaft 24 passes, and inwardly angled sidewalls 34 and 34a. The spacer 30 separates a top plate 36 from a bottom plate 38. The base 32 is fastened to the end wall 8 of the coupler by means such as screws 32b which move through aligned passageways 32c and 32d respectively, in the base and the end wall. The channel spacer has an angle bracket 31 fixed to the base 32 and to the top plate 36. A bushing member 33 for the countershaft extends from the angle to the bore 32a.

Both the top and bottom plates 36 and 38 are somewhat triangular shaped and have skirt portions respectively at 36a and 38a. An angular abutment member 40 depends from the tip of the triangular top plate 36. A vertical working shaft 42 is journaled in slightly oversized bores 44 and 46, respectively, in the top and bottom plates. A cutting head 48 is detachably mounted at the end of working shaft 42 by screw 50 which engages internally threaded bore (not shown) in the end of the working shaft 42. The long axis of the countershaft 24 is therefore parallel to the plates 36, 38 and normal to the long axis of the working shaft 42. A spring 52 is positioned between rings 52a and 52b. Collar 54 and setscrew 54a are used to provide any adjustment in distance between a selected cutting head and the spring. Angle bracket 40 has a slightly oversized shaft 42 and bracket 40 serves as an abutment member against which spring 52 is compressed when the shaft 42 is vertically displaced upwards.

An oversized spur gear 56 is fixed to the top of the working shaft 42 and said spur gear is in meshing engagement with the gear train which includes bevel gear 58 on driving shaft 24 and bevel gear 60 at the top of shaft 62 which is journaled to the top and bottom plates 36, 38 at 62a and 62b. Bevel gear 60 has a fixed gear 68 which meshes with aligned gear 56, but is thinner relative thereto. This allows the oversized gear to remain in meshing engagement with gear 68 when shaft 42 is vertically displaced. The gear train preferably steps up the rotational speed of the cutting head, for example, the rotational speed of the working shaft is about 2 times the speed of the countershaft.

A wraparound shield 70 extends from the top to the bottom plates on each side and turns around the front of said plates. Such wraparound shield is removably held to the top and bottom plates by a plurality of fasteners such as screws indicated at 72 and 72a.

A planar foot plate 74 is shown removably mounted to the coupler by screw 74a and to the bottom plate by screw 74b. The bottom of the foot plate is related to the position of the cutting head 48 so that the bottom 48a of the cutting head is substantially coplanar with the bottom 74c of the foot plate when the tool is maneuvered or guided on a support surface while in working operation. This is a marked advantage because the adapter tool may be guided on a level plane relative to the support surface so the cutting tool may advantageously perform its cutting operation.

In the preferred form, the cutting head, which may be a disc with cutting teeth in its circumferential periphery, is biased from the bottom of the housing so that the bottom 48a of the cutting head is offset below the bottom of the planar member 74. When the adapter tool is placed on a support surface, such as a floor, the cutting head and the working shaft 42 will be displaced vertically upwardly against spring 52. The bottom 48a of the cutting head will therefore be maintained substantially coplanar with the bottom of the planar foot plate 74. This self-adjustment feature assures a desirable working relationship between the cutting head and the planar foot base which is important for effecting the cutting action as near as possible to the support surface. The cutting head may also move above the foot plate if a small obstruction is contacted, or if the tool is tilted at its forward end.

This embodiment leads to other advantages because other cutting heads having varying thicknesses may be mounted on the working shaft to effect cutting grooves of different dimensions. Such cutting heads of varying thicknesses will likewise be moved into the desired working relationship with the bottom of the planar foot base because of the vertical displacement of the working shaft 42, and the biasing means which tend to move the cutting head back towards the support surface. Such a flexibility permits the same planar foot base to be used with a selection of cutting heads of different thicknesses.

The dimensions of the coupler are, of course, selected so that the socket head closely approximates the forward arcuate portions of the electric drill to which the adapter is to be mounted. While the dimensions of the coupler may be modified for accommodation to different electric drills, a large number of commercially available electric drills can be mounted to a coupler designed to relatively standard dimensions, with respect to the length of the socket and the interior conformation of the coupler socket. It is also provided that annular bushings or the like may be mounted on either a power tool or in the socket 10 to take up any undesired play between the tool and the coupler.

The adapter tool may be surely guided on a support surface to effect a cutting operation by the cutting head which is positioned in advance of the forward end of the housing. Among the many uses to which the adapter tool may be directed is the grooving of moldings or walls to lay floor tile next to the wall. Use of the tool is also contemplated in construction and repair of window jambs, and for still other uses which will occur to practitioners.

It is an important feature of this invention that the disclosed coupler for power tools may be combined with adapter tools other than the adapter described herein. Such a tool need only have a countershaft or the like which is disposed to pass through aligned countershaft bores such as 26 and 32a so a chuckhead such as 18 may engage the countershaft.

The invention may now be practiced in the various ways which will occur to practitioners, and all such practice is intended to be a part of the present invention provided it comes within the terms of the following claims as given further meaning by the language of the preceding specification.

I claim:
1. A cutting tool coupler for a power tool, including:
a substantially horizontal countershaft mounted in the coupler for engagement with the working head of a power tool;
a coupler part for the power tool having a socket to removably receive the forward position of the power tool, said socket being of preselected dimensions to approximate the forward portions of said power tool, a tool-inserting passageway in said coupler part aligned with means on the power tool to engage said countershaft, and a plurality of fastening means in said coupler part to form interlocks with said power tool forward portions;
an adapter housing part, a working shaft in substantially normal relation to the countershaft and to the top and bottom of said housing, said working shaft extending through a passageway in the bottom of said housing part;
a cutting head outside the housing part and rotatably mounted on the end of said working shaft, said cutting head having an edge in advance of the housing and lying in a plane which is normal to the longitudinal axis of the working shaft;
a planar foot plate mounted to the bottom of the housing part, said foot plate being substantially coplanar with the cutting head so that the cutting head may be guided in its working operation in a coplanar relation relative to the support surface on which said tool is placed;
a gear train between the driving shaft and the countershaft to translate the drive from the horizontal countershaft to the working shaft, substantially at a right angle thereto, when the cutting tool coupler is mounted to the power tool; and
means to urge said working shaft outwardly of the housing part, said means allowing limited vertical displacement of said working shaft to retain meshing engagement with said gear train.

2. A cutting tool as in claim in which the gear train includes an oversized gear on the working shaft, a smaller gear in said gear train adapted to mesh with said oversized gear, and said working shaft being vertically displacable but said oversized gear remaining in meshing contact with said smaller gear throughout the entire path of said displacement part.

3. A cutting tool as in claim 2 wherein the cutting head lies in a plane which is offset below the plane of the foot plate by the means which urge the working shaft out of the housing, whereupon said cutting head is raised against the urging means when the foot plate engages a support when the tool is placed in operation.

4. A cutting tool as in claim 3 in which the cutting head is a disc having a plurality of cutting teeth in the circumferential periphery, and said cutting head is demountable from the end of the driving shaft so that similar cutting disc, but of varying thicknesses, may be interchanged on the end of the driving shaft, whereby such cutting disc of different thicknesses may be used in conjunction with the same foot plate.

5. A cutting tool as in claim 1 wherein:
the inner end of said countershaft is in meshing engagement with the gear train;
said gear train including a gear lying in a plane parallel to the top and bottom of the cutting tool, said gear meshing with an oversized gear lying in a plane parallel to the top and bottom of the cutting tool, said oversized gear positioned on said working shaft;
said housing including a top wall and a bottom wall, the top of said working shaft journaled in an oversized bore in the top wall tp permit vertical displacement of said working shaft;
said working shaft passing through an oversized bore said bottom wall to likewise permit vertical displacement of said working shaft;
a fixed abutment member positioned relative to said displaceable working shaft; and
a spring positioned around said working shaft between said abutment member and said bottom wall, whereby
said working shaft is yieldable upwardly but is urged downwardly by said spring to a normal position where the cutting head is slightly offset below the bottom of the base plate.

6. A cutting tool as in claim 5 in which the foot plate is removably mounted to the bottom wall of the housing and to the bottom of the coupler.